Dec. 18, 1945. C. M. WICKSTRUM 2,391,373
OUTLET FLANGE FOR TANKS
Filed June 28, 1943
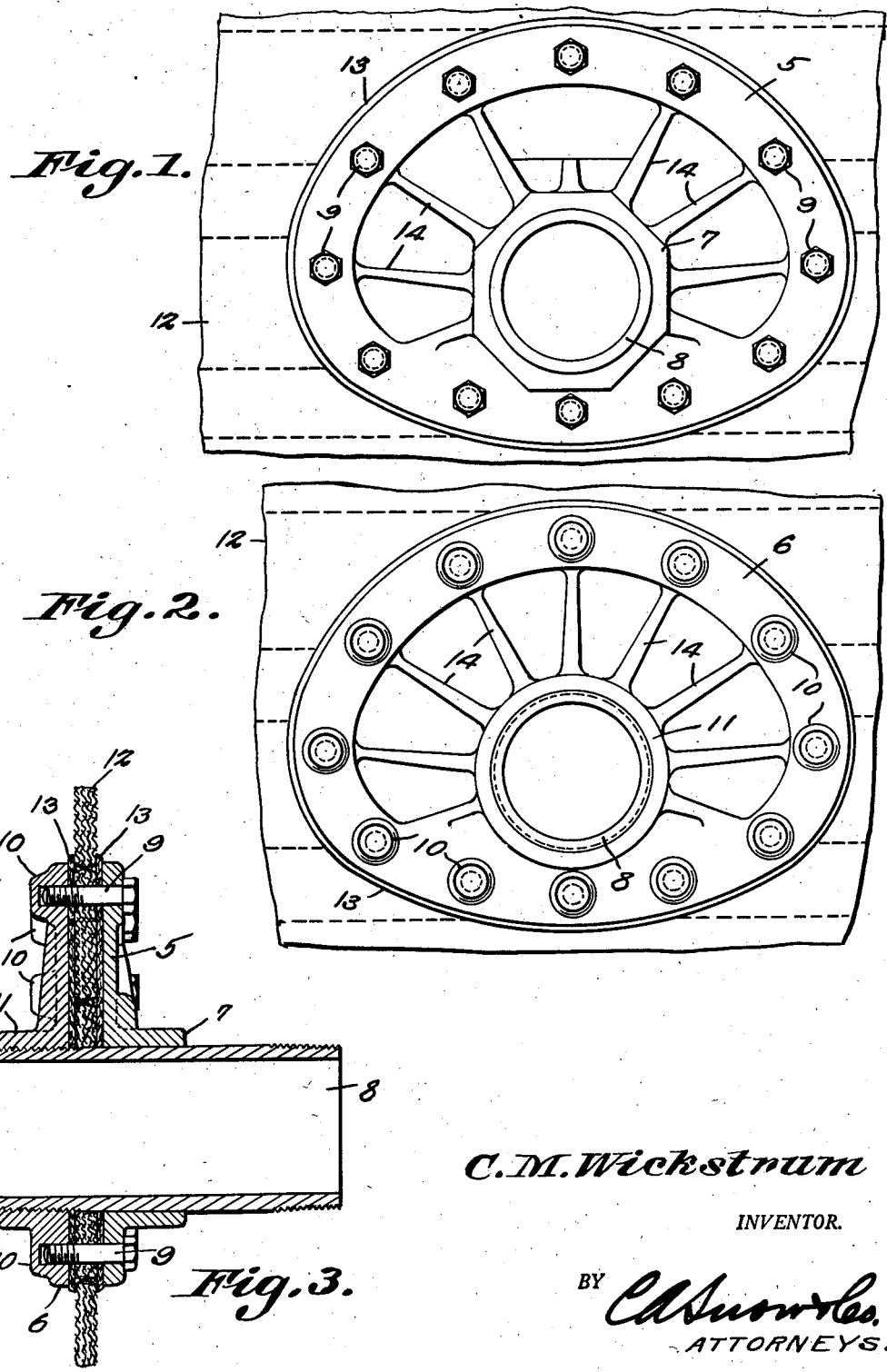
C. M. Wickstrum
INVENTOR.
BY
ATTORNEYS.

Patented Dec. 18, 1945

2,391,373

UNITED STATES PATENT OFFICE 2,391,373

OUTLET FLANGE FOR TANKS

Cecil M. Wickstrum, Omaha, Nebr.

Application June 28, 1943, Serial No. 492,626

1 Claim. (Cl. 285—38)

This invention relates to outlet flanges designed for use with liquid containing tanks, and more particularly for use with portable tanks constructed of flexible or fabric material.

An important object of the invention is to provide an outlet flange designed to provide means for attaching pipe fittings to a liquid storage tank constructed of canvas or other suitable liquid-proof material, in a secure, serviceable and sanitary manner.

Another object of the invention is to provide an outlet flange embodying separable sections constructed in such a manner that the securing bolts used in drawing the sections together, may be operated exteriorly of the tank, with the result that the flanges may be tightened while the tank is filled.

Still another object of the invention is to provide an outlet flange wherein an unbroken metallic surface to the liquid is presented, thereby preventing the contact of the liquid contained in the tank, with the canvas or wall of the tank at the outlet opening of the tank.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In said drawing:

Figure 1 is an elevational view of the outer flange of the device.

Figure 2 is an elevational view of the inner flange of the device.

Figure 3 is a sectional view through the device, showing an outlet pipe secured thereto.

Referring to the drawing in detail, the device comprises an outer flange section 5 and an inner flange section 6, the flange sections being substantially wide to contact a wide surface of the wall of the tank, with which the device is used.

The outer flange is formed with an extension 7 which is of a diameter to permit the pipe 8, which is used with the flange, to be inserted through the outer flange section. The extension 7 is octagon-shaped as clearly shown by Fig. 1 of the drawing, for the reception of a wrench, so that the outer section may be held against movement, when the fittings are being applied or removed from the pipe 8.

A plurality of openings are formed in the outer flange section, for the reception of the bolts 9 which are used in drawing the flanges of the device together.

The inner flange section is formed with bosses 10 that are formed on the inner surface thereof, the bosses 10 being bored inwardly from the outer or smooth surface of the inner section, for the reception of the threaded ends of the bolts 9. Thus it will be seen that when the flange sections are positioned with respect to the wall of a tank, the bolts may be operated from a position exteriorly of the tank to draw the flanges together into clamping relation with respect to each other. It will further be seen that should it become necessary to tighten the flanges, the bolts may be operated without the necessity of emptying the tank.

The inner flange 6 is formed with an internally threaded flange 11 that is adapted to receive the inned threaded end of the pipe 8, as clearly shown by Fig. 3 of the drawing.

The reference character 12 designates the wall of the tank, which is preferably constructed of canvas or other suitable material treated for waterproofing.

Gaskets indicated at 13 are positioned against the adjacent faces of the flanges 5 and 6 to further insure a fluid-tight connection between the flanges of the device.

In constructing the flanges 5 and 6, ribs 14 are provided to reenforce the flange sections, providing an outlet flange for a tank, which is exceptionally strong and durable.

Due to the construction shown and described, it will be seen that since the outlet flange is constructed in such a way that the outlet pipe 8, to which the fittings are secured, connects only with the inner flange section, and completely covers the edge of the outlet opening of the tank, material of the tank at the opening, is guarded against the action of the contents of the tank.

What is claimed is:

An outlet flange for attachment to flexible storage tanks, comprising outer and inner members having aligning pipe openings, adapted to be positioned against opposite sides of the wall of a storage tank at the outlet opening of the tank, an inwardly extended internally threaded annular flange formed on the inner member, said flange forming a continuation of the wall of the pipe opening, said inner member having threaded bores closed at their inner ends, said outer member having an outwardly extended annular flange forming a continuation of the wall of the pipe opening thereof, the outer surface of the latter flange having flat wrench surfaces, said outer member also having bolt openings adapted to align with the threaded bores of the inner member, bolts extending into said bolt openings and threaded bores, securing the members and wall of the tank together, and a pipe having external threads adapted to cooperate with the threads of the flange of the inner member, securing the pipe in place, and said pipe adapted to engage the inner surface of the flange of said outer member.

CECIL M. WICKSTRUM.